July 31, 1923.
G. M. CAMERON-COWBURN
1,463,610
DRIVING GEAR SPECIALLY APPLICABLE TO MOTOR PROPELLED CYCLES
Filed Dec. 7, 1921
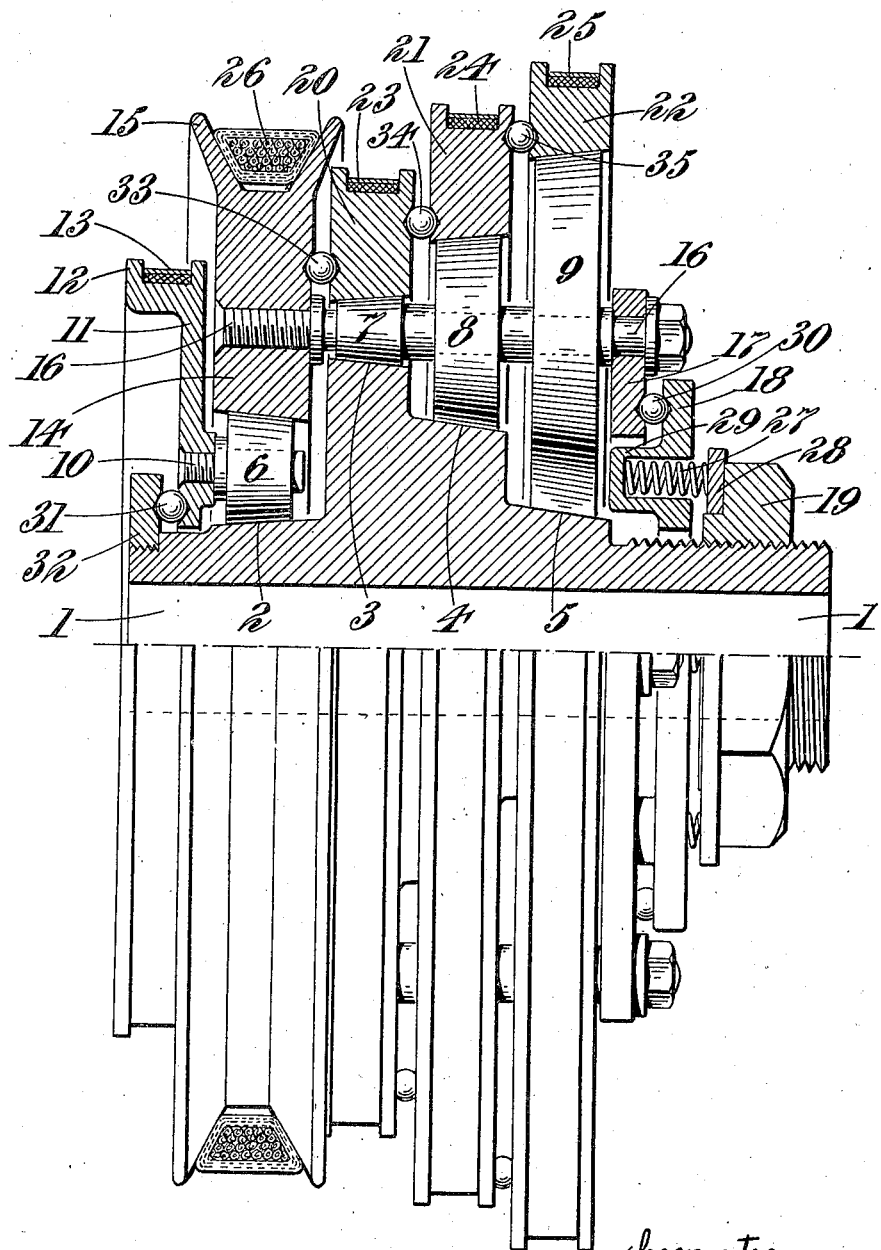
Inventor —
G. M. Cameron-Cowburn
by
Hubert E. Peck atty Patented July 31, 1923.

1,463,610

UNITED STATES PATENT OFFICE.

GERTRUDE MABEL CAMERON-COWBURN, OF GOSPORT, HANTS, ENGLAND.

DRIVING GEAR SPECIALLY APPLICABLE TO MOTOR-PROPELLED CYCLES.

Application filed December 7, 1921. Serial No. 520,531.

*To all whom it may concern:*

Be it known that I, GERTRUDE MABEL CAMERON-COWBURN, a subject of the King of Great Britain and Ireland, and resident of Gosport, Hants, England, have invented new and useful Improvements in Driving Gears Specially Applicable to Motor-Propelled Cycles, of which the following is a specification.

This invention of improvements in driving gear has for its object the provision of driving gear which shall be applicable, in particular but not exclusively, to motor propelled cycles, and shall enable such vehicles when used in combination or not with side cars to be propelled backwards mechanically as well as forwards. The invention also has for its object the provision of an improved and simplified form of change speed gearing with a reverse drive.

Driving gear in accordance with this invention comprises a driving member, a driven member, two sets of epicyclic or sun and planet gearing having the sun members thereof integral with or mounted on the driving member and the planet members of one set carried by the driven member and of the other set interposed between the driving and driven members, and means to cause one or other of the sets of gearing to function.

Change speed gearing with a reverse drive, in accordance with this invention, comprises a driving member, a driven member, a plurality of sets of epicyclic or sun and planet gearing for forward driving having the sun members thereof integral with or mounted on the driving member and the planet members carried by the driven member, a set of epicyclic or sun and planet gearing for the reverse drive also having its sun member integral with or mounted on the driving member and its planet members interposed between the driving and driven members, and means to cause the desired set of gearing to function.

In carrying out this invention, the sun members are constituted of smooth paths integral with or mounted on the driving member and the planet members of smooth cylindrical or conical rollers which roll on the sun members, are carried by a plate and are contained within and in rolling contact with a ring. In one part of the construction, the carrying plate for the planet members constitutes the driven member which is caused to rotate in relation to the driving member when the containing ring is held against movement and in another part of the construction, the driven member constitutes the containing ring for the planet members which are carried by a plate which can be held against movement.

In order that the invention, the nature of which has been set forth, may be clearly and readily understood, reference will now be made to the accompanying sheet of drawings on which is illustrated, in sectional elevation, one construction of change speed gearing with a reverse drive in accordance with this invention.

1 is a sleeve which is mounted on the engine crank shaft by which it is driven. Exteriorly of and integral with the sleeve 1 are four circular portions 2, 3, 4, 5 of different diameters, which constitute paths. The peripheral faces of the paths 2, 3, 4, 5 are parts of cones, the inclination or slope of the path 2 being opposite to that of the paths 3, 4, 5. In rolling contact with each of the paths 2, 3, 4, 5 is a set of cones or coned rollers 6, 7, 8, 9 respectively. The rollers 6 are revolubly mounted on pins 10 which are secured in a plate 11 mounted on and free to revolve with, or in relation to, the sleeve 1. The plate 11 has a grooved periphery 12 which contains a band 13 which, when tightened thereon by suitable means, constitutes a brake and holds the plate 11 against rotational movement. The rollers 6 are also in rolling contact with the inner face of a ring 14, which is coned to correspond with the rollers 6 and forms a path therefor. The ring 14 has a grooved outer periphery 15 in which is seated a belt 26, which transmits power to other parts of the vehicle or mechanism to which the gearing is applied. The member 14 thus constitutes the driven member.

The rollers 7, 8, 9 progressively increase in size and the paths 3, 4, 5 progressively decrease in size. 16 are pins which are secured in the ring 14 and extend therefrom over the paths 3, 4, 5. Each pin 16 has three rollers revolubly mounted thereon, one on each of the sets 7, 8, 9. The pins 16 are secured at their other ends in an annulus 17. The annulus 17 is free to revolve in relation to the sleeve 1 and is kept in position by a plate 18 and nut 19, which latter is screwed on the sleeve 1. 27 are springs which are interposed between a washer 28 and the plate 18, the springs 27 being contained partly within sockets 29 in the plate 18. A ring of balls 30 is interposed between the annulus 17 and plate 18; 31 is another ring of balls interposed between the plate 11 and a ring 32 screwed on the sleeve 1.

Each set of rollers 7, 8, 9 is in rolling contact with the inner face of a ring 20, 21, 22 respectively, which is coned to correspond and forms a path therefor. Each of the rings 20, 21, 22 has a grooved outer periphery which contains a band 23, 24, 25, respectively, and which, when tightened thereon by suitable means, constitutes a brake to hold the ring against rotational movement. The rings 14, 20, 21, 22 are separated from one another by interposed rings of balls 33, 34, 35.

In use, a forward drive is obtained by tightening one of the bands 23, 24 or 25 in the groove in its ring; the lowest forward speed being obtained when the band 25 is operative, an intermediate forward speed when band 24 is used and the highest forward speed when band 23 is functioning. Assume that band 23 is caused to function; the ring 20 is held and when the sleeve 1 is driven, compound rotational movement, i. e., movement about their axes and about the sleeve 1, is imparted to the rollers 7. This compound rotational movement of the rollers 7 imparts rotary movement to the driven member 14 and so drives the belt 26. The rollers 6, 8, 9 run idly. When the band 23 is released, and the band 13 tightened, the plate 11 is held. On rotation of the sleeve 1 the rollers 6 have a simple rotational movement imparted to them, and drive the member 14 in the reverse direction. At this time, the rollers 7, 8, 9 run idly.

What I claim is:—

Change speed gearing with a reverse drive comprising a driving member, a driven member encircling the driving member, a plurality of sets of sun and planet gearing for forward driving having the sun members formed by friction gears integral with the driving member, a series of pins carried by the driven member and extending laterally therefrom over the sun members, smooth faced rollers forming the planet members of said gearing mounted on said pins and engaging the sun members, a ring forming a drum encircling each set of sun and planet gearing and having an interiorly smooth face forming a friction gear engaging the respective planet member, braking means for each of said drum forming rings whereby said rings can be selectively held against rotation; and a set of sun and planet gearing for reverse driving of said driven member having the sun member formed by a friction gear integral with said driving member, a disc freely revoluble in relation to the driving or the driven member, means for holding said disc against rotation, a series of pins carried by said disc, and smooth faced rollers mounted on said disc carried pins and engaging said sun forming friction gear of the reverse driving gear set, the said reverse drive sun and planet gearing contained within the driven member which is interiorly formed to provide a friction gear engaging the reverse drive planet forming rollers.

Dated this 14th day of November, 1921.
GERTRUDE MABEL CAMERON-COWBURN.